United States Patent [19]
Tajima et al.

[11] Patent Number: 5,895,697
[45] Date of Patent: Apr. 20, 1999

[54] OPTICAL INFORMATION MEDIUM

[75] Inventors: Toshiaki Tajima; Yuji Tomizawa; Ryou Negishi; Emiko Hamada; Toru Fujii, all of Tokyo, Japan

[73] Assignee: Taiyo Yuden Co., Ltd., Tokyo, Japan

[21] Appl. No.: 08/955,156

[22] Filed: Oct. 21, 1997

[30] Foreign Application Priority Data

Nov. 16, 1996 [JP] Japan .................................. 8-320891
Nov. 16, 1996 [JP] Japan .................................. 8-320893

[51] Int. Cl.$^6$ .................................................. B32B 3/00
[52] U.S. Cl. .................... 428/64.1; 428/64.2; 428/64.4; 428/913; 430/270.11; 430/495.1; 430/945; 369/283; 369/288
[58] Field of Search ............................ 428/64.1, 64.2, 428/64.4, 64.8, 913; 430/270.14, 270.15, 270.16, 495.1, 945, 270.11; 369/275.1, 283, 288

[56] References Cited

U.S. PATENT DOCUMENTS 5,470,691  11/1995  Arai et al. ............................ 430/273
5,549,952  8/1996  Arai et al. ............................ 428/64.4
5,705,247  1/1998  Arai et al. ............................ 428/64.1

*Primary Examiner*—Elizabeth Evans
*Attorney, Agent, or Firm*—Flynn, Thiel, Boutell & Tanis, P.C.

[57] ABSTRACT

An optical information medium comprises a first disc forming information recording layer on a main surface thereof, a second disc being bonded to the first disc at the surface where the information recording layer is formed by way of an adhesive. A hydrophilic resin film is formed on the surface of the disc at the inner peripheral side extending from the center hole to the information non-recording area. The hydrophilic resin film is damp and is rough compared with the other portion formed of non-hydrophilic resin, and it is elastic. The characters, patterns or designs can be printed on the optical information medium using water-base ink, etc. after manufacturing the optical information medium. Further, the hydrophilic resin film is formed on the disc at the portion outside the information recording area. Further, when the hydrophilic resin film is formed, the surface of the inner and outer peripheral portions of the optical information medium protuberates slightly thicker than other portion so that the fats of the fingers is hardly stuck to the recording surface of the optical information medium even if the inner and outer peripheral portions of the disc is grasped by hand.

7 Claims, 3 Drawing Sheets

OPTICAL INFORMATION MEDIUM

BACKGROUND OF THE INVENTION

1. Field of the Invention

The present invention relates to an optical information medium comprising one disc formed of a transparent substrate and having an information recording area at least at a main surface thereof and another disc which is bonded to the one disc.

2. Prior Art

A digital video disc (DVD) capable of recording and reading information of a high-density put into practical use associated with the recent development and practical utilization of a laser having a short wavelength. The optical information medium of this type can adopt a structure in which two discs are bonded.

A read-only optical information medium having such a structure for bonding two surfaces of discs has a hole at the center thereof and an inner peripheral side information non-recording area at the outside thereof. A pair of discs which are bonded to each other comprise a transparent substrate and an information recording area provided outside the inner peripheral side information non-recording area on the main surface of one of the discs, and a pit serving as an information recording means formed on the information recording area, and a reflecting layer formed of a metal film and provided on the pit. Further, as an optical information medium capable of recording information, a tracking guide is formed on the information recording area provided on at least one disc, and an optical recording layer formed of organic dyes, etc. is formed on the tracking guide by a means such as a spin-coating process. Still further, a reactive curing resin as an adhesive is coated on the surfaces of a pair of discs by means of the spin-coating process or a screen printing, and the coated surfaces are laid on top of another to oppose each other, and two discs are bonded to each other by the adhesive set forth above.

In the optical information medium, two discs are bonded by the adhesive as mentioned above. However, since the surface of the disc on which the inner peripheral side information non-recording area is provided is smooth, slippage is liable to occur between a clamper and the disc when the smooth surface is clamped by an optical information medium player so as to rotate the disc. As a result, there occurs a problem of faulty operation and non-reproduction of the record involved in the displacement of clamping position or rotating variation.

In the optical information medium set forth above, since the surface of the disc in the inner peripheral side information non-recording area is smooth, when the outer peripheral portion is grasped by hand, the disc is slippery and liable to be dropped. Accordingly, two surfaces of the optical information medium at the peripheral side portion are frequently normally grasped by fingers, thereby soiling the recording surface of the optical information medium with fats on the fingers.

SUMMARY OF THE INVENTION

It is an object of the invention to provide an optical information medium capable of preventing slippage between a disc and a clamper at the portion inside the information non-recording area, and clamping the optical information medium stably, and printing or entering characters or patterns onto the surface extending from a clamping area to a center hole thereof using water-based ink.

A second object of the invention is to provide an optical information medium which is easily grasped by hand, and which is difficult to be soiled at the surface thereof, even if it is grasped, and which can enhance its shock absorbence when it drops and stability of rotation when information is reproduced.

To achieve the above object, the present invention provides an optical information medium comprising a disc formed by bonding two discs by an adhesive, wherein a hydrophilic resin film 7 is formed on the surface of the disc at the inner peripheral side and/or outer peripheral side thereof excluding an information recording area.

That is, the optical information medium according to the present invention comprises one disc having a main surface on which an information recording layer and another disc which is bonded to the one disc at the main surface where the information recording layer is formed by an adhesive. The hydrophilic resin film is also formed on the surface of the disc at the inner peripheral side of an information non-recording area and/or at the outer peripheral side of the information recording area.

For example, the hydrophilic resin film comprises a hydrophilic UV curing resin film, more particularly, the hydrophilic resin film is, for example, a hydrophilic ultraviolet-curing one and, more precisely, formed by a hydrophilic resin which includes at least one of polyethylene oxide, polyvinyl alcohol, polyvinyl methyl ether, polyvinyl formal, carboxyvinyl polymer, hydroxyethyl cellulose, hydroxypropyl cellulose, methyl cellulose, carboxymethyl cellulose sodium salt, polyvinyl pyrrolidone and morpholine.

Although, according to the optical information medium, the hydrophilic resin film is formed on the surface of the disc extending from the center hole to the information non-recording area, it is damp and rough at the surface compared with the other portion formed of a non-hydrophilic resin, and it is elastic. Accordingly, the frictional resistance between the disc and clamper is increased and the disc hardly slips. Further, because of the hydrophilic resin film, the characters, patterns or designs can be printed on the optical information medium using water-based ink, etc. after manufacturing the optical information medium.

Further, the disc is large in frictional resistance and hardly slides when the inner peripheral side or outer peripheral side of the optical information medium is grasped by the fingers by the employment of the hydrophilic resin film at the side inside the area where the information recording layer is formed or the outside surface. Further, when the hydrophilic resin film is formed, the surface of the inner and outer peripheral portions of the optical information medium protuberates slightly thicker than the other portion so that the fats of the fingers hardly stick to the recording surface of the optical information medium, even if the inner and outer peripheral portions of the disc is grasped by hand. Further, since the hydrophilic resin film is elastic, it absorbs a shock when the order drops so that the optical information medium hardly cracks at the inner and outer peripheral edges thereof. Still further, since the disc of the inner and outer peripheral portions thereof is increased in weight per unit area as compared with the other portion where the hydrophilic resin film is not formed, the moment of rotation of the disc increases so that it is stabilized when rotated.

In the optical information medium having such an arrangement, slippage between the disc and the clamper at the portion extending from the information non-recording area to the inner peripheral side and the portion from the information non-recording area to the outer peripheral side are respectively prevented, so that the optical information medium can be stably clamped. Further, the optical information medium is easily grasped, and is hardly soiled at the surface thereof, even if it is grasped, and it is improved with shock absorbence when it drops and also improves the stability of rotation thereof when the information is reproduced. Still further, it is possible to print or enter the characters or patterns on the portion extending from the clamping area to the center hole or on the portion extending from the area to the outer peripheral side using water-based ink upon completion of the optical information medium.

PREFERRED EMBODIMENT OF THE INVENTION

Figure 1:
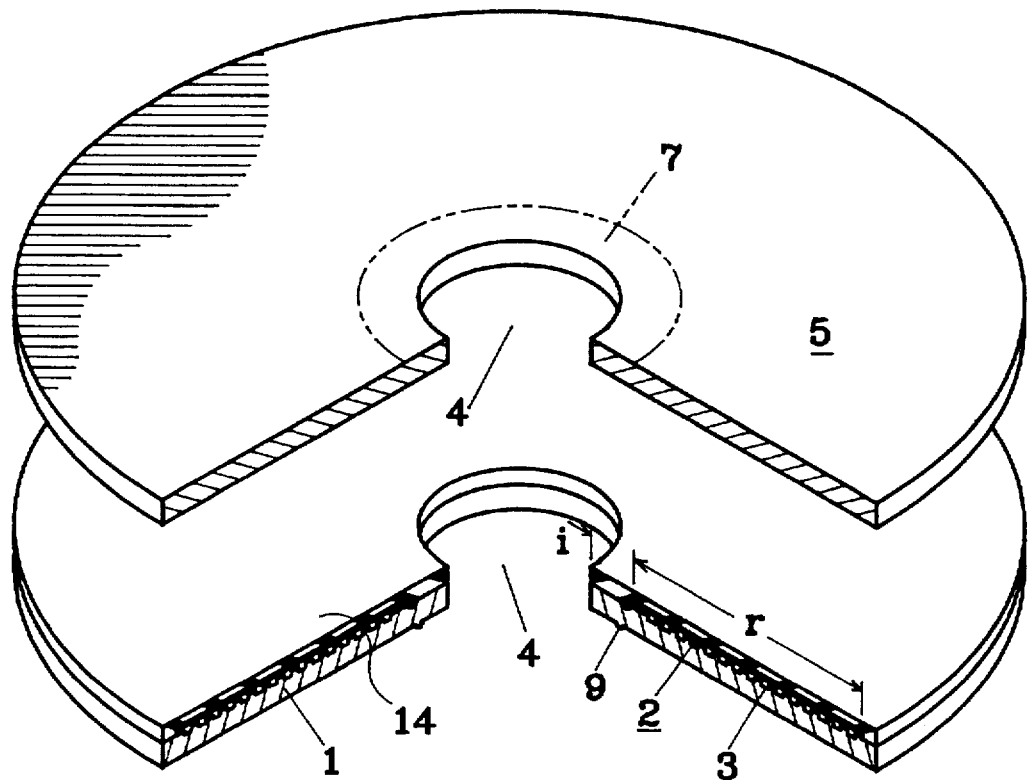
FIG. 1 is an exploded perspective cross-sectional view of an optical information medium which is cut substantially in half in a state before two discs are bonded to each other according to an embodiment of the invention.

An optical information medium according to a preferred embodiment of the invention will be now described specifically and in detail with reference to the attached drawings.

The optical information medium according to the present invention is now described with reference to FIGS. 1 and 2 by exemplifying a WORM (write once, read many times) type optical information medium having a structure where two discs are bonded to each other and information can be recorded at one side and reproduced.

A disc 1 is a transparent circular plate-shaped substrate having a hole 4 at the center thereof. The disc 1 is most preferably prepared from a transparent resin such as a polycarbonate or polymethylmetacrylate (PMMA), but it may be prepared from a glass substrate.

An information recording area r is set or provided outside an inner peripheral side information non-recording area i on one surface of the transparent disc 1. A tracking guide 3 comprising a spiral groove is formed on the information recording area r. Pitching of the tracking guide 3 normally ranges from 0.74 to 0.8 μm.

Further, an information recording layer 2 is formed on the main surface of the disc 1 on which the information recording area r is provided. For example, organic dyes, etc. are coated on the disc 1 to form an optical recording layer 12 by means of a spin coating process, etc., then a reflecting layer 13 made of a metal film such as gold, aluminum, silver, copper, or an alloy film thereof, is formed on the optical recording layer 12. A protecting film 14 made of a resin may be formed on the reflecting layer 13. The embodiment in FIGS. 1 and 2 has the protecting film 14 made of resin, etc. on the reflecting layer 13, but the protecting film 14 may be omitted. Further, the inner peripheral side information non-recording area i is provided inside the information recording area r of the disc 1.

Figure 2:
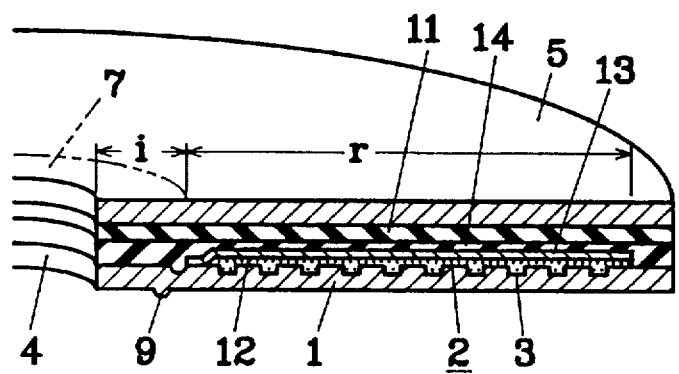
FIG. 2 is a partial cross-sectional view of the optical information medium of claim 1, which is cut partially.

In FIGS. 1 and 2, a protrusion 9 is formed on the main surface of the front side of the disc 1 where information is stored and it is ring-shaped and arranged at the inside of the information recording area r. The protrusion 9 prevents the recording surface from contacting the surface of another optical information medium when two optical information media are laid on top of the other.

A hydrophilic resin film 7 is formed on the front surface of the disc 1 to extend from the center hole 4 to the inner peripheral side information non-recording area i. In FIGS. 1 and 2, the hydrophilic resin film 7 appears only on the front surface of the other disc 5, described later, but it is also formed on the main surface of the front side of the disc 1 to extend from the center hole 4 to the inner peripheral side information non-recording area i.

The hydrophilic resin film 7 may be formed on the surfaces of the discs 1 and 5 at the positions set forth above by coating the surfaces with a hydrophilic resin. The following materials can be listed as such a hydrophilic resin. Polyethylene oxide, polyvinyl alcohol, polyvinylmethyl ether, polyvinyl formal, carboxyvinyl polymer, hydroxyethyl cellulose, hydroxypropyl cellulose, methyl cellulose, sodium carboxymethyl cellulose, polyvinyl pyrolidone, morpholine, ketone formaldehyde, styrene, maleic anhydride copolymer, shellac, dextrin, poly(pyrrolidonyl ethyl acrylate), polyacrylic acid and metal salts thereof, polyamine, polyacrylamide, polyethylene glycol, poly (diethylamino-ethyl(meth)acrylate), polyhydroxystyrene, polyvinyl alkyl ether, polyvinyl-hydroxy benzoate, polyphthalic acid, cellulose acetate hydroxydiene phthalate, a graft polymer such as, for example, LH-40 comprising methyl methacrylate as a backbone chain and N-methylol acrylamide as a side chain (available from SOKEN KAGAKU Co., Ltd.), water soluble alkyd, water-soluble polyester, water-soluble polyepoxy, polyamide, polyvinyl methyl ether, saponified polyvinyl acetate, carboxymethyl cellulose, carboxymethyl cellulose sodium salt, gum arabic, guar gum, sodium alginate and the like.

At least one of these hydrophilic resins is used for coating by formulating the following photopolymerizing monomers and photointiators, and other additives, if necessary.

While considering reliability and productivity, such as weather resistance, water resistance, warpage, etc., and adjusting the balance thereof during formulation, these resins are mixed. The amount of the hydrophilic resin to be added is desirably in the range of 5 to 20% by weight, although such an amount may be in the range of 5% by weight or more to the dissolution limit, for example about 50% by weight.

A photopolymerizing monomer may be added to the above mentioned resins. Further, a hydrophilic photopolymerizing monomer may be used instead of the resin. The hydrophilic photopolymerizing resin includes at least a monomer selected from the group consisting of, for example, polyether-modified mono(meth)acrylate, (meth) acrylamide derivative, mono(meth)acrylate having an amino group, mono(meth)acrylate having a hydroxyl group, mono (meth)acrylate having a phosphate group, and nitrogen containing cyclic vinyl monomer. More precisely, the above mentioned resin includes at least a monomer selected from the group consisting of dimethyl acrylamide (SN-SX-2838:

available from SUNNOPCO), polyethylene, mono(meth) acrylate having a glycol unit, alkyl-substituted (meth) acrylamide, alkoxy-modified (meth)acrylamide, methylol-modified (meth)acrylamide, N,N-dimethylaminoethyl (meth)acrylate, N,N-diethylaminoethyl (meth)acrylate, hydroxypropyl (meth)acrylate, polyalcohol diglycidyl ether mono(meth)acrylate, alkylene oxide-modified phosphoric acid mono(meth)acrylate, caprolactone-modified phosphoric acid mono(meth)acrylate, acryloyl morpholine, N-vinyloxazolidone, N-vinylsuccinimide, N-vinylpyrrolidone, and N-vinyl caprolactam. Further, in order to improve photo-curing properties, (meth)acrylic acid esters of a polyhydric alcohol and an alkylene oxide adduct thereof, polyhydric alcohol diglycidyl ether di(meth) acrylate, etc. are used. These compounds may be properly added to the hydrophilic resin in an amount of 50 to 100% by weight.

A photo initiator is further blended to the thus obtained resin to form an ultraviolet-curing resin. Such a photo initiator includes, for example, acetophenone, benzophenone, Michler's ketone, benzylbenzoin, benzoin ether, benzoyl benzoate, benzyl dimethyl ketal, 1-hydroxycyclohexyl phenyl ketone, thyoxantone, benzyl, 2-ethylanthraquinone, methylbenzoyl formate, diacetyl and the like. The photo initiator is properly added in an amount of 1 to 8% by weight, and desirably 2 to 6% by weight. The printing workability of the resin is decreased when the photo initiator is added excessively, while the productivity thereof is reduced due to a longer curing time, or its ultraviolet curing properties are not sufficiently obtained when too small of an amount of a photo initiator is added. The above-mentioned resin may be mixed with the photopolymerizing monomer to adjust the viscosity.

Other additives may be formulated in the hydrophilic resin. For example, water absorbing pigments, wetting agents, antifoaming agents, surface tension adjusting agents, etc. are desirably formulated. More precisely, there maybe added an inorganic pigment such as fine-powdered silica, talc, mica, calcium carbonate, titanium oxide, zinc white, colloidal silica, carbon black, ion oxide red, and the like; an organic pigment such as a fine powder of, for example, caboxymethyl cellulose, dextrin, methylcellulose, etc., polyvinyl-pyrrolidone which has been amide acrylates-insolubilized by specific coating, acrilic acid/vinyl alcohol copolymer (Sumika gel SP-510 available from Sumitomo Chemical Industries Co., Ltd.), collagen powder and the like; a conventional anionic or nonionic wetting agent such as Nopco 2272 RSN, Nopcowet 50 and Nopcowet SN 20T available from Sun Nopco; an anti-foaming agent such as Nopco 8034 available from Sun Nopco, Dehydran 1620 available from Henkel and AD 9301 available from Mitsubishi Rayon; a surface tension adjusting agent such as Perenol s43 and s5 available from Henkel; and a thickening agent such as SP 103 available from Nippon Shokubai Co., Ltd.

The water absorbing pigment as an additive plays a role in adjusting the coefficient of friction with a clamper and printing properties of an ink or workability during hydrophilic film formation. The wetting agent improves the wetability and adjusts the fluidity of the hydrophilic resin, thereby yielding a less foaming product. This allows the use of the same facility applied to other film forming processes in an optical information medium production such as screen printing and thus improves the productivity. The antifoaming agent and the surface tension adjusting agent allows the formation of a film uniformly.

It is desirable that the hydrophilic resin contains no solvent such as water, ethyl alcohol, isopropyl alcohol, ethylene glycol, ethyl cellosolve, dimethylformamide and the like. Such a solvent might penetrate into discs 1 and 5 as a substrate and decrease its reliability. Further, the solvent affects the viscosity of the hydrophilic resin when the resin film 7 is formed by screen printing, etc., which is inconvenient from the viewpoint of production.

The thickness of the hydrophilic resin film 7 ranges from 5 to 30 µm, and this thickness can be attained by adjusting the viscosity while the aforementioned materials are properly combined.

It is possible to apply an appropriate pattern to the hydrophilic resin film per se in advance, or an appropriate indication can be printed on the optical information medium using water-based ink in advance or after the optical information medium is manufactured.

The WORM optical information medium has the following dimensions. The diameter of the center hole 4 of the disc 1, namely, the inner diameter of the disc 1 is 15 mm, and the outer diameter and the thickness of the disc 1 are respectively 120 mm and 0.6 mm. The hydrophilic resin film 7 set forth above is formed on the surface of the disc 1 to extend from the center hole 4 to the inner peripheral side information non-recording area i. Further, the tracking guide 3 and information recording layer 2 are provided on the disc 1 at the area ranging from 48 mm to 116 mm in diameter thereof forming the information recording area r. The information recording area r is an area for recording signals therein and forms a pit for bringing about an optical interference between incident light and reflecting light of the regenerated laser light, which interference is partially different from that of the other portion.

Further, the other disc 5 is prepared in addition to the disc 1. Although the other disc 5 is made of the same material as the disc 1 and has the same size as the disc 1, the tracking guide 3 and information recording layer 2 are not provided on the disc 5, although they are provided on the disc 1. It is needless to say that the information recording area r having the tracking guide 3 and information recording layer 2 can be provided on the other disc 5 like the disc 1.

As mentioned above, the hydrophilic resin film 7 is formed on the surface of the front surface of the other disc 5 to extend from the center hole 4 to the inner peripheral side information non-recording area i like the disc 1.

Thereafter, two discs 1 and 5 are bonded to each other. For example, a reactive curing resin as an adhesive 11 is coated on one main surface of at least one of the discs 1 and 5 by means of a spin coating process or screen printing process, then the discs 1 and 5 are laid on top of the other while they oppose each other. As a result, the main surfaces of the discs 1 and 5 are bonded to each other by the adhesive 11 which is formed when the reactive curing resin is cured. In this case, the surface of the disc 1, on which the information recording layer 2 is formed, is bonded to the main surface of the other disc 5.

For example, at least one of the surfaces of the discs 1 and 5, which is to be bonded, is directed upward and a UV curing resin which is not cured drops on the same surface. Thereafter, the predetermined surfaces of the discs 1 and 5 to be bonded to each other are laid on top of the other. As a result, the adhesive 11 spreads between the discs 1 and 5 owing to the pressure received by the discs 1 and 5 and capillary phenomenon. When the adhesive 11 spreads over the entire surface of the inner peripheral side information non-recording area i between the discs 1 and 5, the discs 1 and 5 are rotated at a high speed to wipe off the excessive UV curing resin. Then, the UV curing resin is irradiated with UV rays from each surface of the discs 1 and 5, so as to cure the adhesive 11 to form the layer of the adhesive 11, thereby fixing the discs 1 and 5 while they are brought into contact with each other.

As another example, cationic UV curing resin is coated on the entire surface of the surface of at least one of the discs 1 and 5, then it is irradiated with UV rays to start the delay curing, then predetermined surfaces of the discs 1 and 5 to be bonded to each other are laid on top of the other. Subsequently, a pressure is applied to the discs 1 and 5 at the thickness thereof to cure the aforementioned resin to form the adhesive 11 so that the discs 1 and 5 are fixed to each other by the adhesive 11 while they are brought into contact with each other. Further, a thermoplastic resin adhesive may be used as the adhesive.

Considering the shock absorbence of the optical information medium, the hardness of the adhesive layer after it is cured is preferably higher than that of the substrate.

The previous example is a case where the disc 1 having the information recording area r of the transparent substrate on which the tracking guide 3 and information recording layer 2 are formed and the other disc 5 on which the information recording layer is not formed are respectively bonded to each other. In the above embodiment, information can be recorded in and reproduced from only one surface of the disc. The other disc 5 may be formed of a non-transparent substrate or it may be colored for keeping light resistance or may have an area where characters or patterns can be written.

On the other hand, two pieces of the disc 1 are prepared wherein the tracking guide 3 and information recording layer 2 are formed on the information recording area r of the transparent substrate, then these two discs are bonded to each other while the information recording layers 2 thereof oppose each other to form an optical information medium capable of recording and reproducing information at both surfaces thereof. As the other disc 5 used in this case, the one forming the tracking guide 3 and information recording layer 2 on the information recording area r like the disc 1 may be used.

Figure 3:
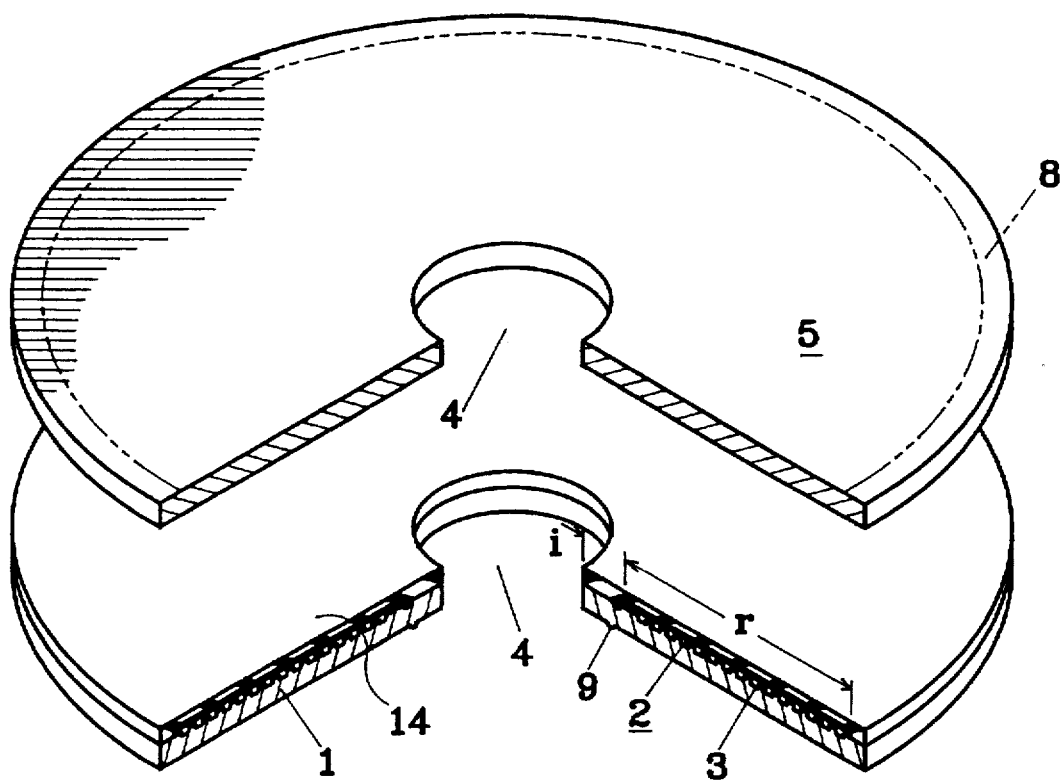
FIG. 3 is an exploded perspective half cross-sectional view of an optical information medium in a state before two discs are bonded to each other according to another embodiment of the invention.
Figure 4:
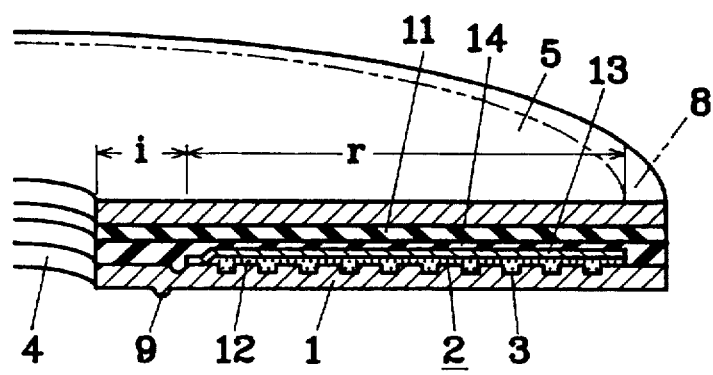
FIG. 4 is a partial cross-sectional view of the optical information medium of claim 3, which is cut partially.

An optical information medium according to still another embodiment of the invention will be next described with reference to FIGS. 3 and 4. A hydrophilic resin film 8 is formed on the front surfaces of the discs 1 and 5 at the portion outside the information recording area r. Although the surface of the other disc 5 appears in FIGS. 3 and 4, the hydrophilic resin film 7 may be formed on the front surface of the disc 1 at the portion outside the information recording area r. Such a hydrophilic resin film 8 may be the same as the hydrophilic resin film 7 which is formed inside the information recording area r of the discs 1 and 5.

Concrete dimensions of the WORM optical information medium will be now described as follows. The hydrophilic resin film 8 is formed on the disc 1 at the portion outside the information recording area r which ranges from 48 mm to 116 mm in diameter, namely, on the surface extending from the surface at 116 mm in diameter to the periphery thereof at 120 mm in outer diameter. It is needless to say that the hydrophilic resin film 7 at the inner periphery side and the hydrophilic resin film 8 at the outer periphery side may be respectively formed on the discs 1 and 5.

Figure 6:
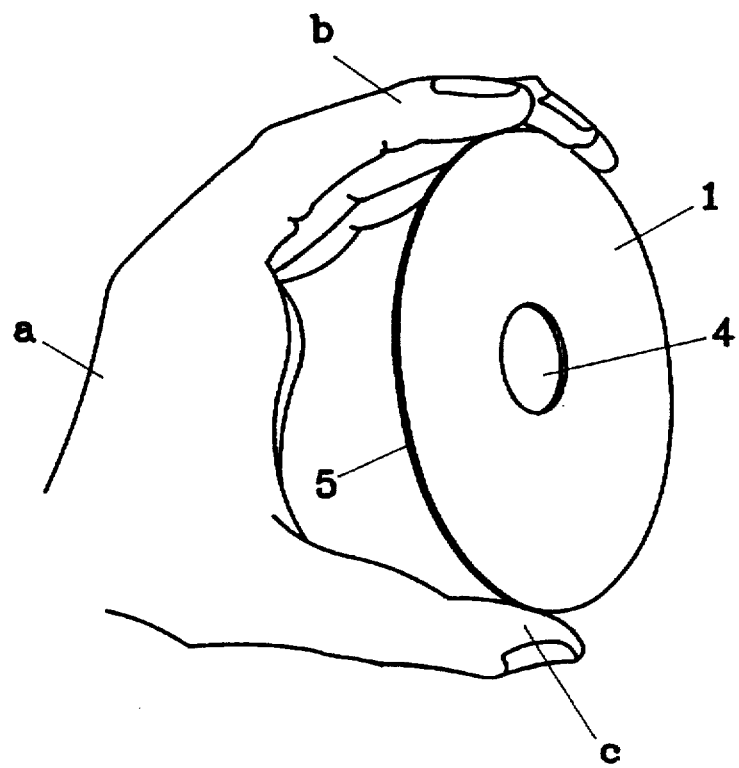
FIG. 6 is a view showing a state where an outer peripheral edge of the optical information medium is gripped and grasped by the fingers.

FIG. 6 shows the recommended way how to grasp the optical information medium. The hydrophilic resin film 8 formed on the discs 1 and 5 at the portion outside the information recording area r on which the information recording layer 2 is formed is damp, and rough at the surface compared with that formed of non-hydrophilic resin, and elastic. Accordingly, when the optical information medium is grasped and held by the fingers b and c of the hand a as shown in FIG. 6, the frictional resistance between the outer peripheral portion of the optical information medium and the fingers b and c becomes large, and hence the optical information medium hardly slips.

Figure 5:
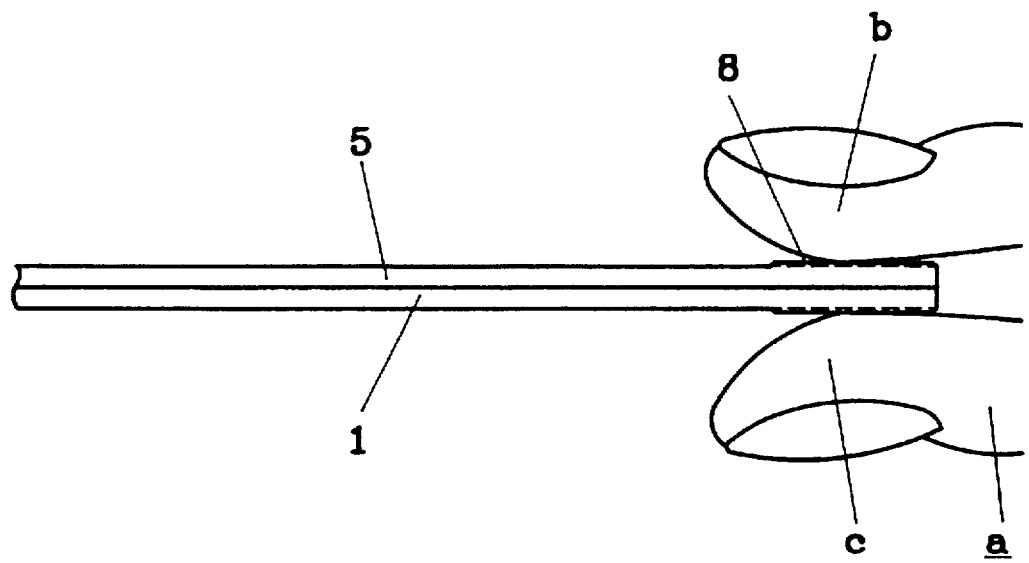
FIG. 5 is a side view showing a main portion of a state where both surfaces of the outer peripheral portion of the optical information medium are gripped and grasped by the fingers.

FIG. 5 is an example showing a way how to grasp the optical information medium which is not recommendable but frequently carried out, wherein the outer peripheral portion of the optical information medium is grasped and held by fingers b and c of the hand a. Since the surface of the outer peripheral portion outside the information recording area r of the optical information medium slightly protuberates from the other portion, even if both surfaces of the optical information medium at the outer peripheral portion is grasped and held by fingers b and c as shown in FIG. 5, fats of the fingers b and c hardly stick to the recording surface of one of the discs 1 and 5. Even if the inner peripheral portion of the optical information medium, not shown, is held by the fingers, the same effect that the optical information medium hardly slips can be attained.

What is claimed is:

1. An optical information medium comprising a first disc having an upper main surface with an information recording layer formed thereon, a second disc having a lower main surface bonded to the upper main surface of the first disc through an adhesive layer and a hydrophilic resin film provided on a portion of an upper main surface of said second disc not covering an information recording area.

2. The optical information medium according to claim 1, wherein the hydrophilic resin film is formed of a hydrophilic UV curing resin film.

3. The optical information medium according to claim 1, wherein the hydrophilic resin film is formed of a film including at least one of polyethylene oxide, polyvinyl alcohol, polyvinylmethyl ether, polyvinyl formal, carboxyvinyl polymer, hydroxyethyl cellulose, hydroxypropyl cellulose, methyl cellulose, sodium carboxymethyl cellulose, polyvinyl pyrolidone, and morpholine.

4. The optical information medium according to claim 1, wherein the portion of the second disc on which the hydrophilic resin film is provided is thicker than the portions of the second disc on which the hydrophilic resin film is not provided.

5. The optical information medium according to claim 1, wherein the surface of the portion of the second disc on which the hydrophilic resin film is provided is rougher than the portions of the second disc on which the hydrophilic resin film is not provided.

6. The optical information medium according to claim 1, wherein the hydrophilic resin film is more elastic than the portions of the second disc on which the hydrophilic resin film is not provided.

7. The optical information medium according to claim 1, wherein the weight per unit area of the portion of the second disc on which the hydrophilic resin film is provided is greater than the portion of the second disc in weight per unit area on which the hydrophilic resin film is not provided.

\* \* \* \* \*